United States Patent
Hisada

(10) Patent No.: US 10,878,286 B2
(45) Date of Patent: Dec. 29, 2020

(54) LEARNING DEVICE, LEARNING METHOD, AND RECORDING MEDIUM

(71) Applicant: NEC Corporation, Tokyo (JP)

(72) Inventor: Daichi Hisada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 203 days.

(21) Appl. No.: 16/078,682

(22) PCT Filed: Feb. 20, 2017

(86) PCT No.: PCT/JP2017/006036
§ 371 (c)(1),
(2) Date: Aug. 22, 2018

(87) PCT Pub. No.: WO2017/145960
PCT Pub. Date: Aug. 31, 2017

(65) Prior Publication Data
US 2019/0057285 A1 Feb. 21, 2019

(30) Foreign Application Priority Data
Feb. 24, 2016 (JP) ................................. 2016-033280

(51) Int. Cl.
*G06K 9/62* (2006.01)
*G06N 3/04* (2006.01)
*G06N 3/08* (2006.01)

(52) U.S. Cl.
CPC ........... *G06K 9/6257* (2013.01); *G06K 9/627* (2013.01); *G06K 9/6262* (2013.01);
(Continued)

(58) Field of Classification Search
CPC .. G06K 9/6257; G06K 9/6256; G06K 9/6262; G06K 9/6263; G06K 9/6264
See application file for complete search history.

(56) References Cited

U.S. PATENT DOCUMENTS

| 5,555,317 A | * | 9/1996 | Anderson | ............ | G06K 9/6256 382/159 |
| 8,370,282 B1 | * | 2/2013 | Leung | .................. | G06K 9/6263 706/20 |

(Continued)

FOREIGN PATENT DOCUMENTS

| JP | 2002-73076 A | 3/2002 |
| JP | 2005-181928 A | 7/2005 |

(Continued)

OTHER PUBLICATIONS

Segaran, "Programming Collective Intelligence Building Smart Web 2.0 Applications", O'Reilly, 2003, pp. 2-3 (total 3 pages).

(Continued)

*Primary Examiner* — Wen W Huang

(57) ABSTRACT

Provided is a learning device that includes at least one processing device configured to select image data as learning data based on classification confidences from a plurality of image data. Each of the classification confidences indicates a likelihood of accuracy of classification for a respective one of the plurality of image data. The at least one processing device is configured to: store the selected image data into a storage; perform learning using the stored image data and generating a learning model; perform classification of the image data used for the learning by using the learning model and update a classification confidence for the classified image data; and update the classification confidences each associated with a respective one of the plurality of image data when a count of image data on which the classification has been performed satisfies a predetermined condition.

10 Claims, 13 Drawing Sheets

(52) U.S. Cl.
CPC ......... *G06K 9/6277* (2013.01); *G06N 3/0454* (2013.01); *G06N 3/08* (2013.01)

(56) References Cited

U.S. PATENT DOCUMENTS

| | | | | |
|---|---|---|---|---|
| 8,682,813 B2* | 3/2014 | Yuta | ..................... | G06K 9/6286 706/12 |
| 8,891,858 B1* | 11/2014 | Preetham | .............. | G06K 9/6256 382/159 |
| 9,613,296 B1* | 4/2017 | Rosen | .................. | G06K 9/6255 |
| 2003/0212851 A1* | 11/2003 | Drescher | .............. | G06K 9/6296 711/100 |
| 2012/0093396 A1* | 4/2012 | Dai | ...................... | G06K 9/6232 382/159 |
| 2012/0288186 A1* | 11/2012 | Kohli | .................. | G06K 9/6255 382/159 |
| 2014/0314311 A1* | 10/2014 | Garera | ................ | G06F 16/9537 382/159 |
| 2014/0372351 A1* | 12/2014 | Sun | ........................ | G06N 99/00 706/12 |
| 2015/0036919 A1* | 2/2015 | Bourdev | ........... | G06F 16/24573 382/156 |
| 2016/0358088 A1* | 12/2016 | Lemmer | ................ | G06N 3/126 |

FOREIGN PATENT DOCUMENTS

| | | |
|---|---|---|
| JP | 2011-192032 A | 9/2011 |
| JP | 5224280 B2 | 7/2013 |

OTHER PUBLICATIONS

Lecun et al., "Gradient-Based Learning Applied to Document Recognition", Proceedings of the IEEE, IEEE, Nov. 1998, vol. 86, No. 11, pp. 2278-2324 (total 47 pages).

International Search Report dated Apr. 25, 2017, issued by the International Searching Authority in application No. PCT/JP2017/006036.

* cited by examiner

Fig.4

| IMAGE CONVERSION NUMBER | IMAGE CONVERSION METHOD |
| --- | --- |
| 0 | DO NOT CONVERT |
| 1 | ROTATE 90 DEGREES |
| 2 | ROTATE 180 DEGREES |
| 3 | INVERT VERTICALLY |
| 4 | INVERT HORIZONTALLY |

LEARNING DEVICE, LEARNING METHOD, AND RECORDING MEDIUM

This application is a National Stage Entry of PCT/JP2017/006036 filed on Feb. 20, 2017, which claims priority from Japanese Patent Application 2016-033280 filed on Feb. 24, 2016, the contents of all of which are incorporated herein by reference, in their entirety.

TECHNICAL FIELD

This disclosure relates to a learning device, a learning method, and a recording medium using machine learning.

BACKGROUND ART

In recent years, image classification method using deep learning has been widely used. When images are learned with deep learning, raw image data (such as RGB values) are learned, and so the memory size required for learning is large. In the learning, an effective learning method that can generate a highly accurate learning model in a short time even if the number of images to be learned increases is required.

For example, PTL 1 discloses that update of the learning model for discriminating the flaw type from the feature quantity of flaw occurring in a flaw inspection target object is performed using only flaw data having a low confidence for a discrimination result of flaw type.

PTL 2 discloses a machine learning system that deletes inappropriate learning data from among candidates of learning data.

PTL 3 discloses a method of accumulating, in a storage unit, data confidence of which satisfies a predetermined criterion which indicates it is required to train a machine learning system, as new learning data.

CITATION LIST

Patent Literature

[PTL 1] Japanese Patent Laid-Open No. 2011-192032
[PTL 2] Japanese Patent Laid-Open No. 2005-181928
[PTL 3] Japanese Patent No. 5224280

Non Patent Literature

[NPTL 1] Toby Segaran, "Programming Collective Intelligence Building Smart Web 2.0 Applications Collective Intelligence", O'Reilly Media, 2007, pp. 3
[NPTL 2] Yann LeCun, Leon Bottou, Yoshua Bengio, Patrick Haffner, "Gradient-Based Learning Applied to Document Recognition", Proceedings of the IEEE, IEEE, November, 1998, VOL. 86, No. 11, pp. 2278-2324

SUMMARY OF INVENTION

Technical Problem

Machine learning is a type of artificial intelligence and is an algorithm that enables computers to perform "learning" (NPL 1). In the machine learning, a model data made by a person is analyzed and a learning model is generated. By using the learning model, future values can be predicted.

In recent years, studies using deep learning have been actively conducted among machine learning techniques in the field of image classification. In ImageNet Challenge, an internationally renowned image classification contest, a system using deep learning continues to dominate the first place in the accuracy since 2012.

Since deep learning is also one of machine learning technologies, it is required to have thousands to over tens of thousands of large-volume images be learned to obtain a highly accurate learning model. However, unlike general document data and time series numerical data, image data has a very large data size per data. For example, for VGA (640×480 pixels) which is a general image size, about 1 MB of data capacity is required per one image. For this reason, to read all of sample data used for learning at one time, a memory of several GB to several tens of GB or more is required. In addition, it is expected that the spread of ultra-high resolution images (4K, 8K) will advance in the future, and accordingly, the amount of memory required for image learning is expected to further increase.

In the technique related to PTL 1, a learning model is updated using only flaw data which indicate a low confidence for the determination result of the flaw type, and therefore, in the case where there is a large amount of flaw data which indicate low confidences, the amount of memory required for learning increases.

In the technique related to PTL 2, data determined to be appropriate as learning data is adopted as learning data even if learning is sufficiently performed. Therefore, in the case where there is a large amount of data judged to be appropriate as learning data, or in the case where data that can be determined to be appropriate as learning data is added, there is a possibility that the amount of memory required for learning increases.

In the technique related to PTL 3, data that has been excluded from accumulation as learning data will never be accumulated as learning data. Therefore, even when learning data becomes suitable for learning through many times of learning, the technique related to PTL 3 does not allow such learning data to be accumulated, which can be hardly said to be efficient.

The present disclosure has been made in view of the above problems, and an object of the present disclosure is to propose a technique for reducing a memory size necessary for learning and efficiently performing learning.

Solution to Problem

A learning device according to one aspect of the present disclosure includes: image selection means for selecting image data as learning data based on classification confidences from a plurality of image data, wherein each of the classification confidences indicates a likelihood of accuracy of classification for a respective one of the plurality of image data and is associated with the respective one of the plurality of image data; image data storage means storing the selected image data; learning means performing learning using the stored image data and generating a learning model; and confidence update means performing classification of the image data used for the learning using the learning model and updating a classification confidence for the image data, wherein the confidence update means updates the classification confidences each associated with a respective one of the plurality of image data when a count of image data on which the classification has been performed satisfies a predetermined condition.

A learning method according to one aspect of the present disclosure includes: selecting image data as learning data based on classification confidences from a plurality of image data, wherein each of the classification confidences indicates a likelihood of accuracy of classification for a respective one of the plurality of image data and is associated with the respective one of the plurality of image data; storing the selected image data; performing learning using the stored image data and generating a learning model; and performing classification of the image data used for the learning using the learning model and updating a classification confidence for the image data, updating the classification confidences each associated with a respective one of the plurality of image data when a count of image data on which the classification has been performed satisfies a predetermined condition.

A computer program for achieving any of the above-described apparatuses or methods with a computer and a computer readable non-transitory recording medium in which the computer program is stored are also included in the scope of the present disclosure.

Advantageous Effects of Invention

According to the present disclosure, a memory size necessary for learning can be reduced, and learning can be efficiently performed.

BRIEF DESCRIPTION OF DRAWINGS

FIG. 4 is a diagram illustrating an example of image conversion information.

EXAMPLE EMBODIMENT

In each of the following example embodiments, it is assumed that machine learning is performed using Convolutional Neural Network (CNN) (see NPL 2) which is a deep learning method, but the present disclosure is not limited thereto.

First Example Embodiment

Figure 1:
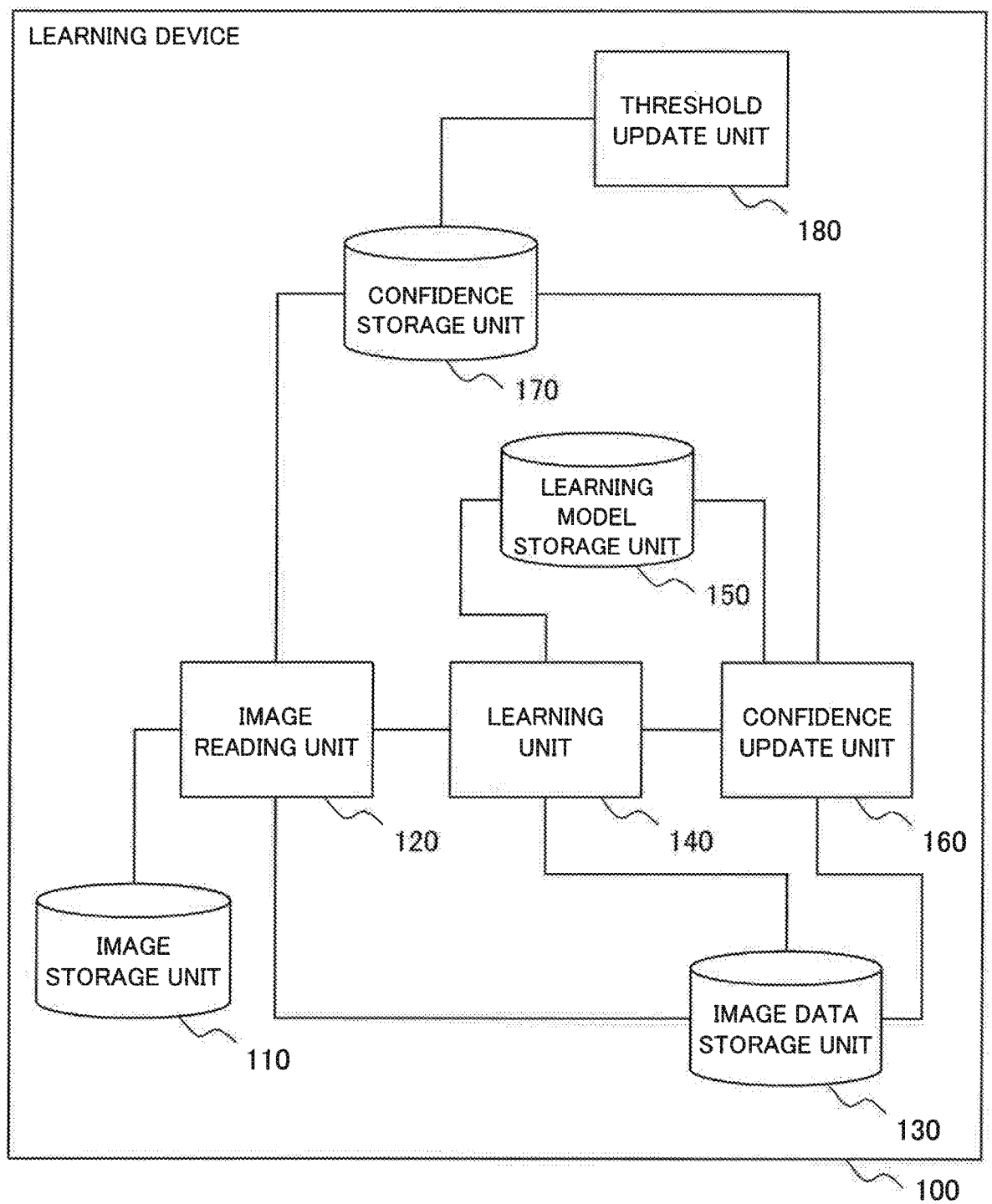
FIG. 1 is a functional block diagram illustrating an example of a functional configuration of a learning device according to a first example embodiment.
Figure 2:
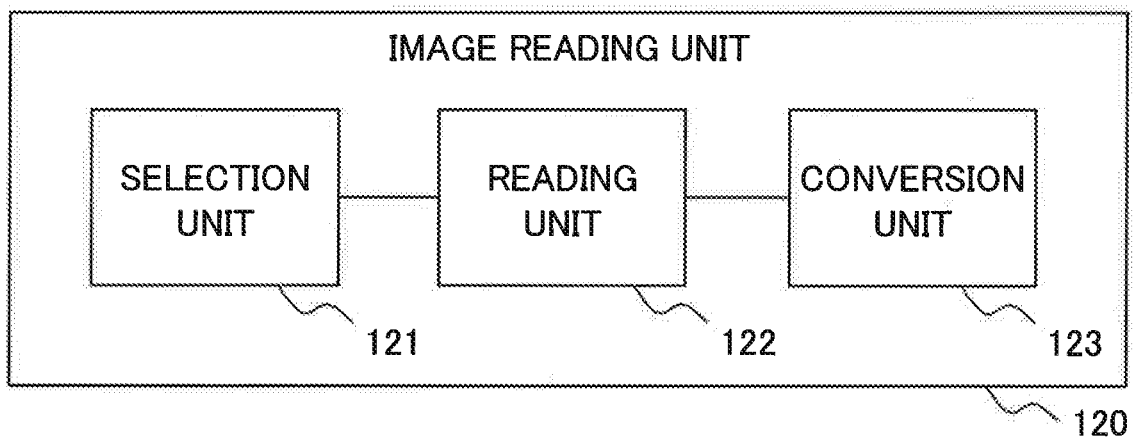
FIG. 2 is a functional block diagram illustrating an example of a functional configuration of an image reading unit of the learning device according to the first example embodiment.
Figure 3:
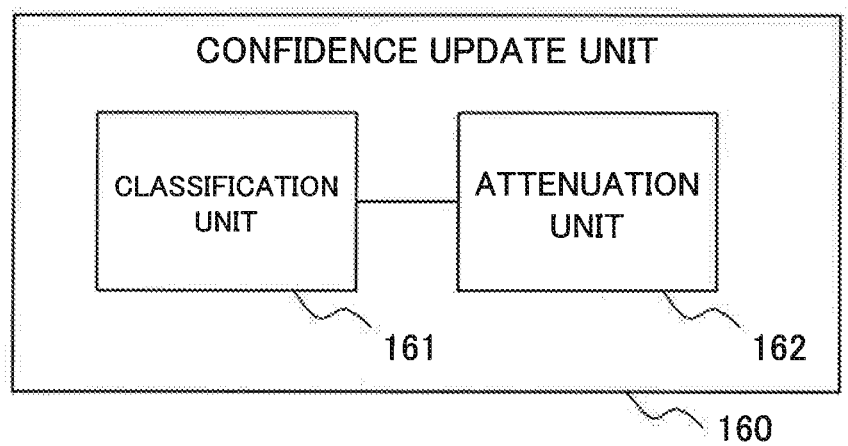
FIG. 3 is a functional block diagram illustrating an example of a functional configuration of a confidence update unit of the learning device according to the first example embodiment.

The first example embodiment will be described with reference to the drawings. FIG. 1 is a functional block diagram illustrating an example of a functional configuration of a learning device 100 according to the present example embodiment. As illustrated in FIG. 1, the learning device 100 according to the present example embodiment includes an image storage unit 110, an image reading unit (image selection unit) 120, an image data storage unit 130, a learning unit 140, a learning model storage unit 150, a confidence update unit 160, a confidence storage unit 170, and a threshold update unit 180. FIG. 2 is a functional block diagram illustrating an example of a functional configuration of the image reading unit 120. FIG. 3 is a functional block diagram illustrating an example of a functional configuration of the confidence update unit 160.

The image storage unit 110 stores image data. All of the image data stored in the image storage unit 110 are image data which can be learning data (subject to learning). That is, the image data stored in the image storage unit 110 are candidates for learning data. The image data stored in the image storage unit 110 may be prepared in advance or may be added every time. The image storage unit 110 may be achieved by a storage device separate from the learning device 100.

The image reading unit 120 reads (selects) image data as learning data on the basis of a classification confidence described later from a plurality of image data stored in the image storage unit 110. Then, the image reading unit 120 applies image conversion processing to the read image data. As illustrated in FIG. 2, the image reading unit 120 includes a selection unit 121, a reading unit 122, and a conversion unit 123.

The selection unit 121 refers to the image reading unit 120 and randomly selects one image data from the plurality of image data stored in the image storage unit 110. The selection unit 121 stores in advance the image conversion information representing an image conversion method. The selection unit 121 randomly selects one image conversion method from the image conversion methods. An example of the image conversion information stored by the selection unit 121 is illustrated in FIG. 4. The image conversion information is information including an image conversion method and an image conversion number which is an identifier for identifying the image conversion method.

As illustrated in FIG. 4, for example, an image conversion method with image conversion number "1" is "rotate 90 degrees". The image conversion methods also include "rotate 180 degrees", "invert vertically", "invert horizontally" and the like, but the image conversion methods are not limited thereto. In other words, five types of image conversion methods are illustrated in FIG. 4, but the number of types is not limited thereto. For example, the image conversion methods may include "rotate 270 degrees". The image conversion information illustrated in FIG. 4 may also include "do not convert".

The selection unit 121 refers to the confidence storage unit 170 using the image conversion number associated with the selected image conversion method and the information representing the selected image data, thereby checking whether or not the combination of image conversion number and the information representing the image data can be learning data. The information representing the image data is, for example, an image name or an identifier. In the specification of the present example embodiment, the information representing image data is described as being an image name. The selection unit 121 refers to a classification confidence for the combination of the image name and the image conversion method and refers to a confidence threshold. The classification confidence is stored in the confidence storage unit 170. When the classification confidence is greater than or equal to the confidence threshold Th (0<Th<1), the selection unit 121 performs selection of image data and selection of an image conversion method again. The details of the classification confidence and the confidence threshold will be described later.

When the classification confidence for the combination of the image name and the image conversion method is less than the confidence threshold Th, the selection unit 121 supplies the image name of the selected image data to the reading unit 122, and supplies the selected image conversion method and image conversion number to conversion unit 123.

Further, the selection unit 121 acquires from the confidence storage unit 170 a learning processing times e, which is a value serving as an indicator about learning by the learning device 100. The selection unit 121 then determines whether the learning processing times e is equal to or greater than a maximum learning processing times Emax stored in the selection unit 121. When the learning processing times e is greater than or equal to the maximum learning processing times Emax, the selection unit 121 determines that the learning has been completed sufficiently and terminates the learning. The maximum learning processing times Emax may be updated when a new image data is added to the image storage unit 110 or may be updated at a predetermined timing. When the learning processing times e is reset at a timing when a new image data is added to the image storage unit 110 or at a predetermined timing, the selection unit 121 may start the selection of image data and the selection of an image conversion method.

In this manner, the selection unit 121 performs selection of image data when the learning processing times e is less than the maximum learning processing times Emax. Redundant learning is not performed on the learning model that has learned sufficiently. As a result, the learning device 100 can perform learning more efficiently.

The reading unit 122 reads, from the image reading unit 120, the image data represented by the image name supplied from the selection unit 121. That is, the reading unit 122 reads the image data selected by the selection unit 121 as learning data. Then, the reading unit 122 supplies the read image data to the conversion unit 123.

The conversion unit 123 receives an image conversion method and an image conversion number from the selection unit 121. The conversion unit 123 also receives image data from the reading unit 122. The reading unit 123 performs image conversion processing on the received image data according to the received image conversion method. Then, the conversion unit 123 stores, in the image data storage unit 130, the image data on which the image conversion processing is performed. Further, the conversion unit 123 supplies an image address, which is information indicating the location of the image data stored in the image data storage unit 130, to the learning unit 140.

The image data storage unit 130 stores the image data on which the image conversion processing is performed by the image reading unit 120. An example of image data stored in the image data storage unit 130 is described herein with reference to FIG. 5.

Figure 5:
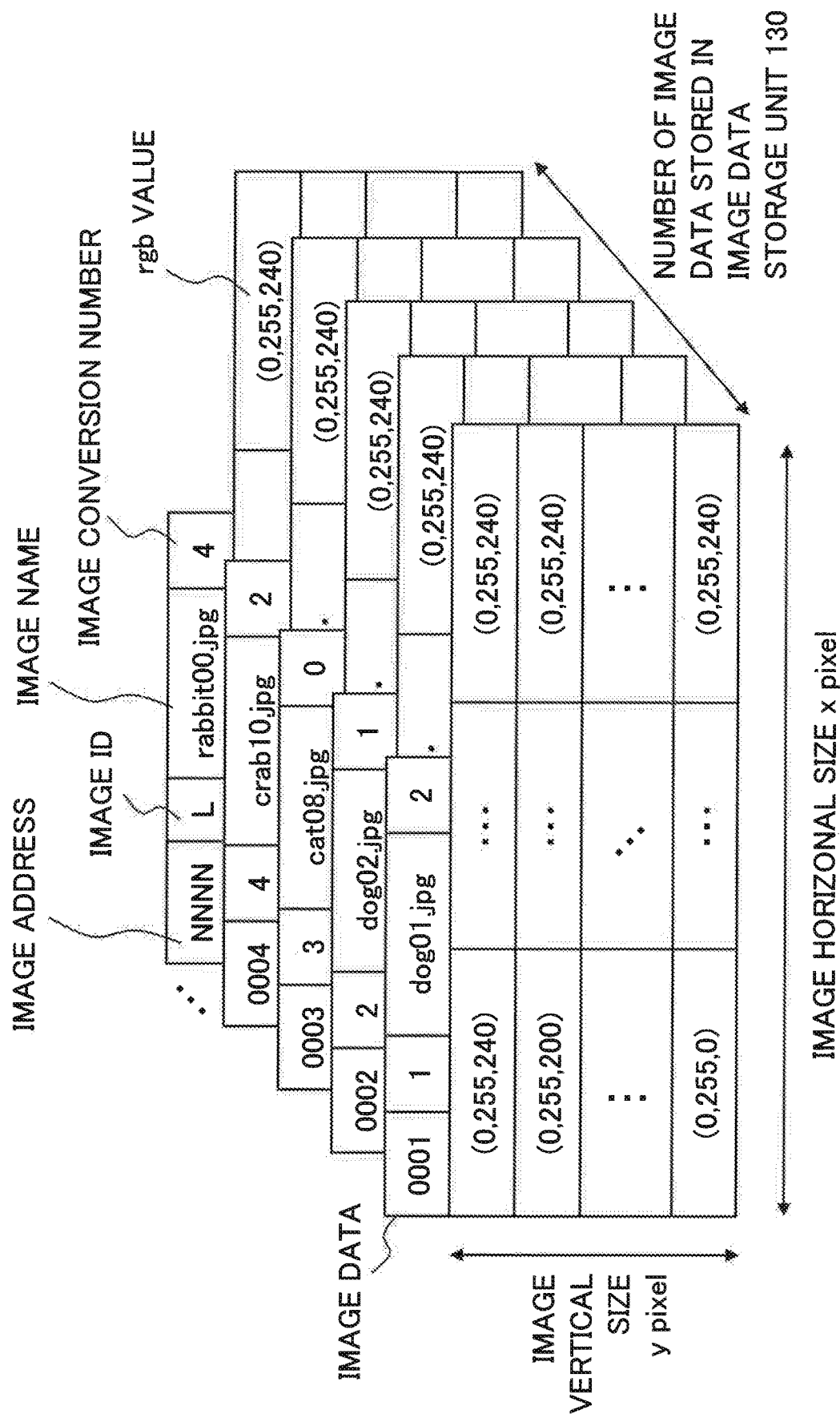
FIG. 5 is a diagram illustrating an example of image data stored in an image data storage unit.

FIG. 5 illustrates an example of image data set stored in the image data storage unit 130 of the learning device 100 according to the present example embodiment. Image data is stored in the image data storage unit 130 in the format shown in FIG. 5, for example. The image data may be data in which the pixel value of each pixel is indicated by the RGB value ((0, 0, 0) to (255, 255, 255)). An image address, information representing the image data, and an image conversion number are associated with the image data. In FIG. 5, the information representing the image data is explained as being the image ID (IDentifier) and the image name, but any one of them may be used, or other identifiers may be used. The number of the image data stored in the image data storage unit 130 may vary according to the memory capacity of the learning device 100.

In the image data storage unit 130, a plurality of such image data are stored.

The learning unit 140 receives the image address from the image reading unit 120. The learning unit 140 refers to the image data storage unit 130 and acquires the image data stored in the received image address. Then, using the acquired image data, the learning unit 140 trains the learning model stored in the learning model storage unit 150. In the present example embodiment, the learning unit 140 performs machine learning using CNN. The learning unit 140 stores the learning model generated (output) through learning into the learning model storage unit 150. Then, the learning unit 140 supplies the image address of the image data used for the learning to the confidence update unit 160.

The learning model storage unit 150 stores the learning model generated by the learning unit 140.

The confidence update unit 160 classifies the image data stored in the image address received from the learning unit 140 using the learning model. The confidence update unit 160 updates, on the basis of a classification result, the classification confidence for the image data stored in the confidence storage unit 170. The confidence update unit 160 updates the classification confidence associated with each of the plurality of image data when the number of image data on which classification has been performed satisfies a predetermined condition. The classification confidence indicates the likelihood of accuracy of classification for the image data. Specifically, the classification confidence is a confidence for a result of a classification of the image data by a learning model, and a value indicating how much confidence the learning model has for the result of the classification. As illustrated in FIG. 3, the confidence update unit 160 includes a classification unit 161 and an attenuation unit 162.

The classification unit 161 receives the image address from the learning unit 140 and holds the image address in itself. The classification unit 161 receives image addresses until as many as K (K is an arbitrary natural number) image addresses are accumulated. When as many as K image addresses have been stored, the classification unit 161 acquires one or more image data stored in the one or more stored image addresses, respectively, from the image data storage unit 130. Then, the classification unit 161 classifies the acquired one or more image data by using the learning model stored in the learning model storage unit 150. The number K of image addresses is set according to the capacity of the image data storage unit 130. Since the received image address is the address of the image data stored in the image data storage unit 130, it can be said that the classification unit 161 confirms that the image data storage unit 130 stores as many image data as the number that are set according to the capacity of the image data storage unit 130.

Then, the classification unit 161 updates the classification confidence for the combination of the image name and the image conversion number of the classified image data stored in the confidence storage unit 170. The classification unit 161 updates the classification confidence to the classification confidence that is output when classifying. The image name and the image conversion number of the classified image data are associated with the image data stored in the image data storage unit 130 as described with reference to FIG. 5. The classification unit 161 may update the classification confidence after acquiring the image name and the image conversion number of the classified image data from the image data storage unit 130, using the image address received from the learning unit 140.

Then, the classification unit 161 deletes the image data used for the classification from the image data storage unit 130. In the case where a new image data (a (K+1)st image data) is not stored in the image data storage unit 130 after the classification unit 161 performs the classification, the classification unit 161 deletes all image data in the image data storage unit 130.

The classification unit 161 holds the number of the deleted image data. Then, the classification unit 161 determines whether or not the number of deleted image data is equal to or more than a predetermined number, after the attenuation unit 162 (described later) attenuates the previous classification confidence. For example, the classification unit 161 determines whether or not the number of deleted image data is equal to or more than the number of image data D stored in the image storage unit 110. The number of image data D is not limited to the number of image data stored in the image storage unit 110 but may be a natural number that is equal to or more than K.

When the number of deleted image data is equal to or more than D, the classification unit 161 transmits an instruction of attenuation of classification confidence to the attenuation unit 162. Then, upon receiving the notification indicating completion of attenuation from the attenuation unit 162, the classification unit 161 returns the number of deleted image data to zero and starts counting the number of deleted image data again.

When the attenuation unit 162 receives the instruction of attenuation from the classification unit 161, the attenuation unit 162 attenuates all the classification confidences stored in the confidence storage unit 170. The image data deleted by the classification unit 161 is image data on which classification has been performed as described above. Therefore, it can also be said that the attenuation unit 162 updates the classification confidences respectively associated with the plurality of image data when the number of classified image data satisfies a predetermined condition.

Specifically, the attenuation unit 162 updates (attenuates) the classification confidence by multiplying all the classification confidences stored in the confidence storage unit by a forgetting factor $\beta$ ($0<\beta<1$). The attenuation unit 162 may attenuate the classification confidence in such a way at predetermined intervals. Then, when an attenuated classification confidence becomes smaller than the confidence threshold Th, the image reading unit 120 can select, on the basis of the classification confidence, the image data associated with the attenuated classification confidence.

Therefore, the learning device 100 can adopt, at predetermined intervals, image data which has deviated from the subject of learning due to the classification confidence of the image data being equal to or more than the confidence threshold Th.

When the attenuation unit 162 attenuates the classification confidence, the attenuation unit 162 adds 1 to the learning processing times e stored in the confidence storage unit 170.

The confidence storage unit 170 stores the learning processing times e. The learning processing times is a value that is an indicator of learning by the learning device 100. As described above, the learning processing times e increases at the timing when the attenuation unit 162 attenuates classification confidences. The timing of increasing the learning processing times e is not limited thereto. The learning processing times e may be reset or attenuated when the user instruct, or when a new image data is added to the image storage unit 110, or at a predetermined timing.

The confidence storage unit 170 stores the confidence threshold Th. One confidence threshold Th may be set for all of the image data or may be set for each image data stored in the image storage unit 110.

Figure 6:
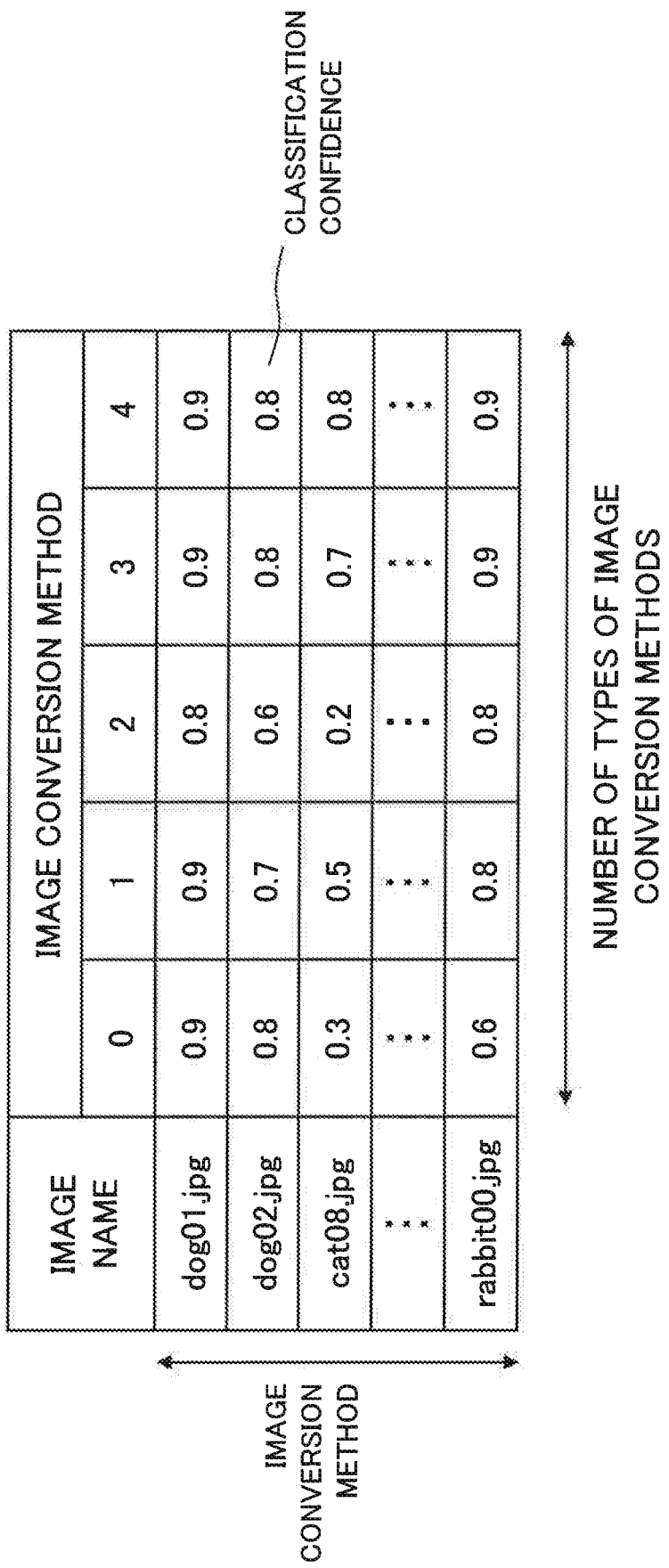
FIG. 6 is a diagram illustrating an example of classification confidences stored in a confidence storage unit.

The confidence storage unit 170 stores the classification confidence. The classification confidence stored by the confidence storage unit 170 is explained herein with reference to FIG. 6. FIG. 6 is a diagram illustrating an example of classification confidences stored in the confidence storage unit 170 of the learning device 100 according to the present example embodiment.

As illustrated in FIG. 6, the confidence storage unit 170 stores the classification confidence for each combination of the image name and the image conversion method. The classification confidence stored in the confidence storage unit 170 is explained as being in the form of a table as illustrated in FIG. 6, but the data form of the classification confidence is not limited thereto. In the table illustrated in FIG. 6, the image names stored in the image storage unit 110 are listed in the first column. In the first column of FIG. 6, the image ID may be stored instead of the image name. For each image name, classification confidences are associated with image conversion numbers respectively associated with image conversion methods. The selection unit 121 can acquire, for example, "0.9" which is a classification confidence for a combination of the image name "dog01.jpg" and the image conversion number "1".

The threshold update unit 180 updates the confidence threshold Th stored in the confidence storage unit 170. Specifically, the threshold update unit 180 updates the confidence threshold Th ($0<Th<1$) using all the classification confidences stored in the confidence storage unit 170. For example, the threshold update unit 180 sorts all classification confidences stored in the confidence storage unit 170 in ascending order, and sets, as a new confidence threshold, the R-th classification confidence from the smallest classification confidence. Here, R is calculated by the following expression.

$$R = \text{number of image data } D \times \text{number of types of image conversion methods } S \times \text{learning rate } L(e) \quad (1)$$

The number of image data D is the number of image data stored in the image storage unit 110, as described above. The learning rate L (e) is expressed by the following equation.

$$L(e) = (\text{maximum learning processing times } E\text{max} - \\ \text{learning processing times } e)/\text{maximum learning} \\ \text{processing times } E\text{max} \qquad (2)$$

In such a way, the threshold update unit 180 may automatically update the confidence threshold according to the progress status of the learning.

The image reading unit 120 selects the image data to be read using the confidence threshold updated by the threshold update unit 180 as described above. Thus, the image reading unit 120 may select the image data to be read according to the progress of the learning.

In an example embodiment where the confidence threshold Th is set for each of image data, the threshold update unit 180 sorts the classification confidences for the image data in ascending order, and adopts the R-th classification confidence from the smallest classification confidence as a new confidence threshold Th. At this time, in expression (1) above, R may be calculated with image data number D as 1.

The timing at which the threshold update unit 180 updates the confidence threshold Th may be an any favorable timing. The threshold update unit 180 may monitor the confidence storage unit 170 and may update the confidence threshold Th when it detects that the classification confidence has been updated. The threshold update unit 180 may update the confidence threshold Th at the timing when all the classification confidences are updated by the attenuation unit 162 or the threshold update unit 180 may update the confidence threshold Th at the timing when any classification confidence is updated by the classification unit 161.

The confidence threshold Th may be, for example, designated by the user using an input device (not illustrated). In this case, if the confidence threshold Th is set to a value close to 1, the learning device 100 learns almost all the image data, and so it takes time to perform learning but can reliably generate a learning model using all the image data. In contrast, if the confidence threshold Th is set to a value close to 0, the learning device 100 omits the learning of image data having high classification confidences, and so the learning device can generate a learning model at high speed. In this way, the confidence threshold may be set according to the requirement for a learning model to be generated.

Figure 7:
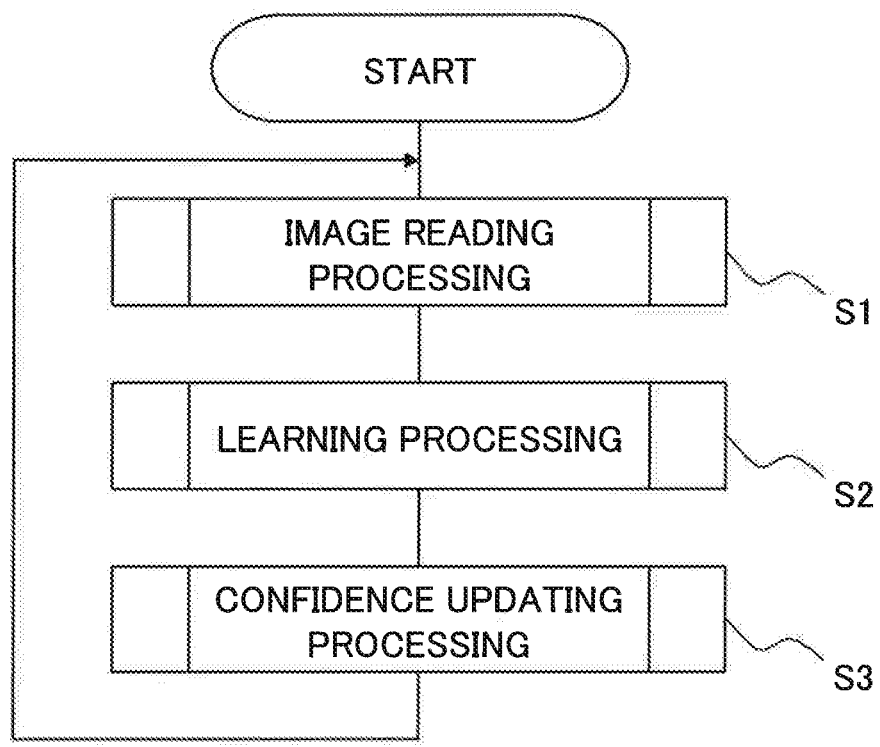
FIG. 7 is a flowchart illustrating an example of a flow of a learning device processing according to the first example embodiment.

Next, the operation of the learning device 100 according to the present example embodiment is described with reference to FIGS. 7 to 10. FIG. 7 is a flowchart illustrating an example of flow of processing of the learning device 100 according to the present example embodiment. As illustrated in FIG. 7, the image reading unit 120 of the learning device 100 executes image reading processing (step S1). This image reading processing will be described with reference to FIG. 8. Then, the learning unit 140 executes learning processing (step S2). The learning processing will be explained with reference to FIG. 9. Then, the confidence update unit 160 executes a confidence updating processing (step S3). This confidence updating processing will be explained using FIG. 10. Thereafter, the learning device 100 repeats the steps S1 to S3 until the image reading unit 120 completes the processing. The above-mentioned S1 to S3 may be independently executed. For example, the image reading unit 120 may perform image reading processing on the next image data without waiting for the end of step S3 when the image reading unit 120 finishes the image reading processing for a certain image data.

Figure 8:
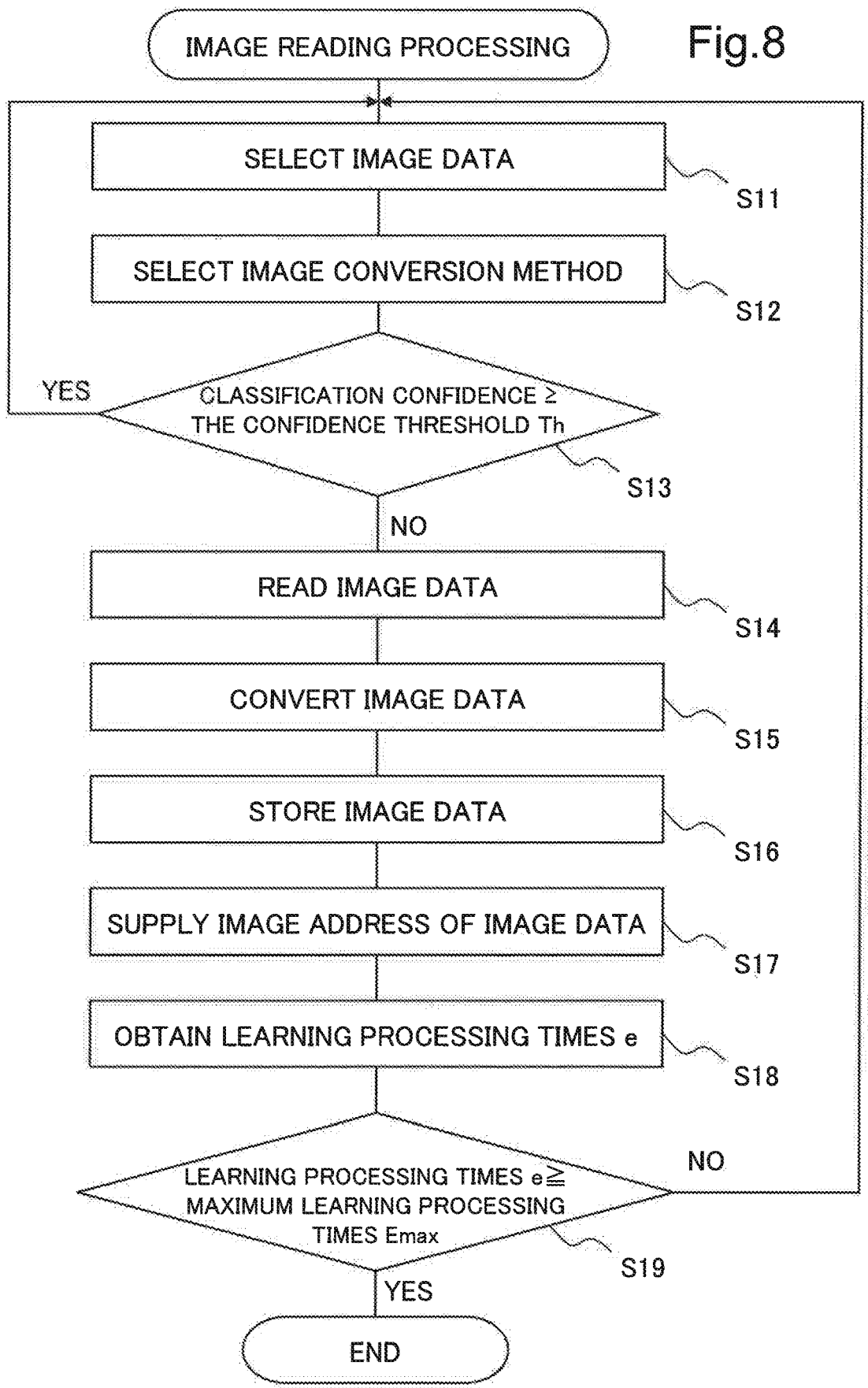
FIG. 8 is a flowchart illustrating an example of a flow of image reading processing in an image reading unit of the learning device according to the first example embodiment.

Next, the flow of image reading processing is explained with reference to FIG. 8. FIG. 8 is a flowchart illustrating an example of a flow of image reading processing in the image reading unit 120 of the learning device 100 according to the present example embodiment.

As illustrated in FIG. 8, the selection unit 121 refers to the image reading unit 120 and randomly selects one image data from a plurality of image data stored in the image storage unit 110 (step S11). Further, the selection unit 121 randomly selects one image conversion method from the image conversion methods (step S12). Step S11 and step S12 may be performed simultaneously or in reverse order.

The selection unit 121 refers to the confidence storage unit 170 using both the image conversion number associated with the selected image conversion method and the information representing the selected image data. And the selection unit 121 checks whether the classification confidence for the combination of image conversion number and the image name is equal to or more than the confidence threshold Th (step S13).

When the classification confidence is equal to or more than the confidence threshold Th (YES in step S13), the selection unit 121 returns to step S11 and selects image data again (step S11). The selection unit 121 repeats step S11 and step S12 until the classification confidence becomes less than the confidence threshold Th.

When the classification confidence is less than the confidence threshold Th (NO in step S13), the reading unit 122 reads the image data selected by the selection unit 121 (step S14).

Then, the conversion unit 123 converts the image data by applying the image conversion processing selected by the selection unit 121 in step S12 to the image data read by the reading unit 122 in step S14 (step S15). The conversion unit 123 writes the converted image data to the image data storage unit 130 (step S16), and supplies to the learning unit 140 an image address indicating the location where the converted image data is written (step S17).

After this step S17, the learning unit 140 may start step S2 illustrated in FIG. 7.

After that, the selection unit 121 acquires the learning processing times e from the confidence storage unit 170 (step S18) and determines whether the learning processing times e is equal to or more than the maximum learning processing times Emax (step S19). When the learning processing times e is equal to or more than the maximum learning processing times Emax (YES in step S19), the selection unit 121 determines that the learning has been sufficiently completed and terminates the learning. When the learning processing times e is less than the maximum learning processing times Emax (NO in step S19), the image reading unit 120 selects the next image data (step S11). In this way, when the learning processing times e is less than the maximum learning processing times Emax, the image reading unit 120 may select the next image data without waiting for the end of processing of the confidence update unit 160 described later, after storing a certain image data into the image data storage unit 130 and supplying the image address of this image data to the learning unit 140. Further, the image reading unit 120 may start the step S11 after the processing of the confidence update unit 160 is completed. In this case, for example, the image reading unit 120 may monitor the confidence storage unit 170 and start step S11 when it is detected that the learning processing times e has been updated by the confidence update unit 160. The selection unit 121 may perform a determination of step S19 before step S11. Further, the selection unit 121 may transmit a learning termination notification to the learning unit 140 when terminating the learning.

Figure 9:
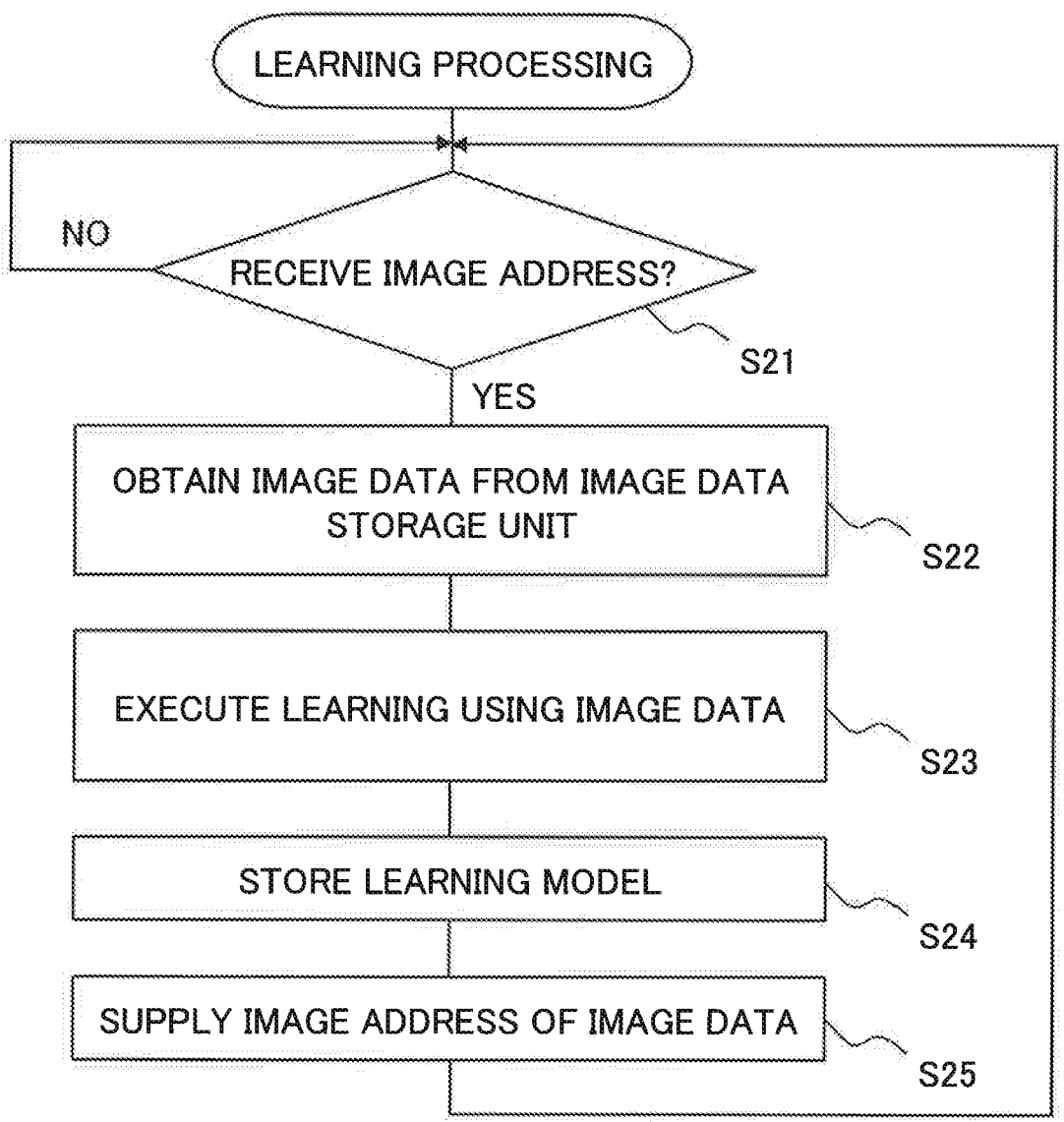
FIG. 9 is a flowchart illustrating an example of a flow of a learning processing in a learning unit of the learning device according to the first example embodiment.

Next, with reference to FIG. 9, the flow of learning processing is explained. FIG. 9 is a flowchart illustrating an example of a flow of learning processing in the learning unit 140 of the learning device 100 according to the present example embodiment.

As illustrated in FIG. 9, the learning unit 140 checks whether or not the image address has been received from the image reading unit 120 (step S21), and repeats the step S21 until the image address is received. It should be noted that learning unit 140 may terminate the learning processing illustrated in FIG. 9 when a predetermined time elapses since the image address was last received or when notification of the learning end is received from image reading unit 120. At this time, the learning unit 140 may also send a notification of learning end to the confidence update unit 160.

Upon receiving the image address (YES in step S21), the learning unit 140 refers to the image data storage unit 130 and acquires the image data stored in the received image address (step S22).

Then, the learning unit 140 performs learning using the acquired image data (step S23). After that, the learning unit 140 stores the learning model generated by learning in the learning model storage unit 150 (step S24). Further, the learning unit 140 supplies the image address of the image data used for learning, i.e., the image address received in step S21, to the confidence update unit 160 (step S25). Step S24 and step S25 may be performed at the same time. Then, the learning unit 140 returns the processing to step S21.

Figure 10:
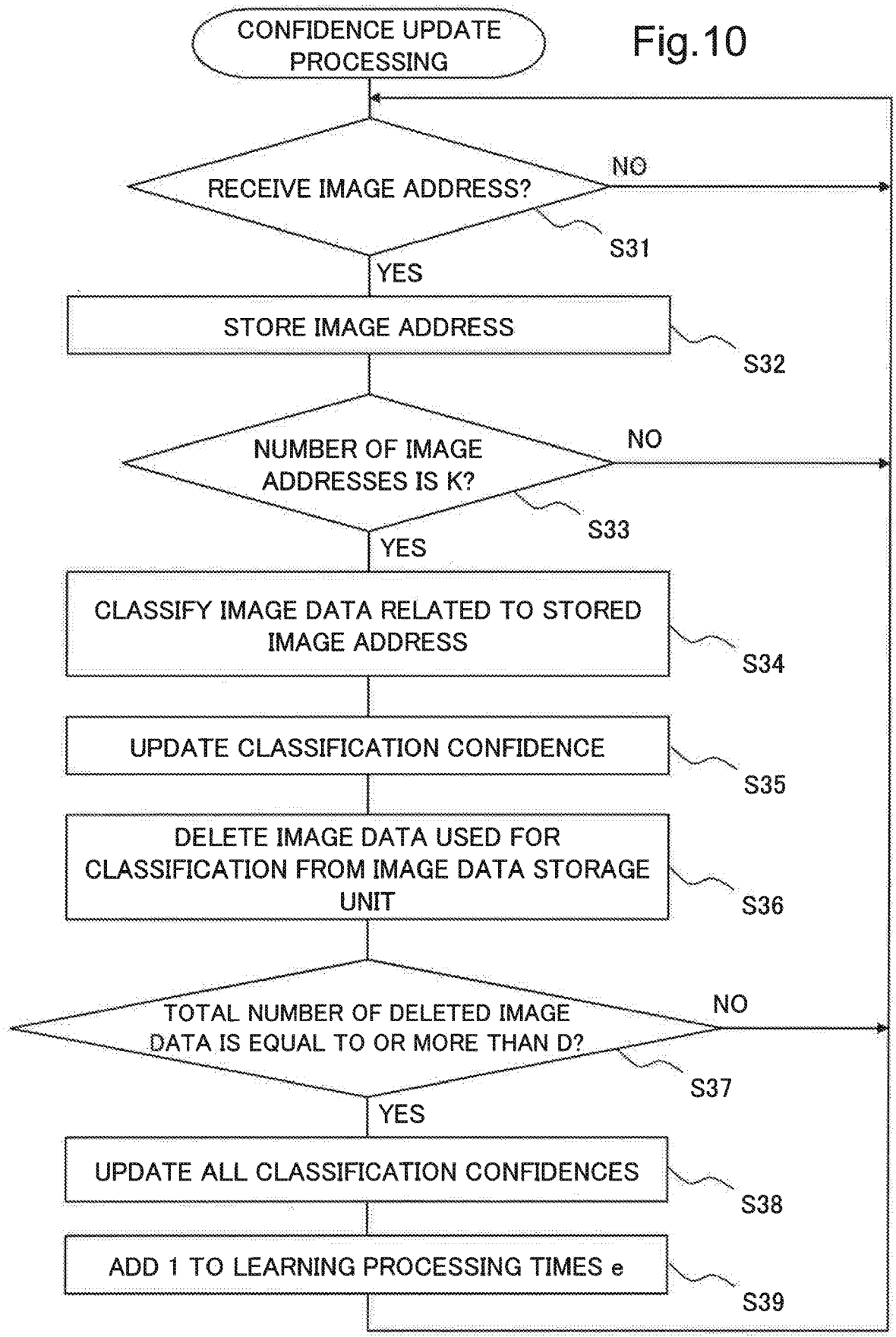
FIG. 10 is a flowchart illustrating an example of a flow of confidence update processing in the confidence update unit of the learning device according to the first example embodiment.

Next, the flow of confidence updating processing will be explained using FIG. 10. FIG. 10 is a flowchart illustrating an example of flow of the confidence update processing in the confidence update unit 160 of the learning device 100 according to the present example embodiment.

As illustrated in FIG. 10, the classification unit 161 checks whether an image address has been received from the learning unit 140 (step S31), and repeats the step S31 until the image address is received. When the classification unit 161 receives the notification of learning end from the learning unit 140, the classification unit 161 may terminate the confidence update processing illustrated in FIG. 10. When a predetermined time elapses since the image address was last received, the classification unit 161 may terminate the confidence update processing illustrated in FIG. 10. In the case where image addresses less than K are stored when a predetermined time elapses since the classification unit 161 receives the image address last, the confidence update unit 160 may terminate the confidence update processing illustrated in FIG. 10 after executing the processing in step S34 and subsequent steps.

Upon receiving the image address from the learning unit 140 (YES in step S31), the classification unit 161 holds the image address in itself (step S32). Then, the classification unit 161 checks whether the number of image addresses is K or not (step S33). When the number of image addresses is less than K (NO in step S33), the classification unit 161 returns the processing to step S31. When the number of image addresses is K (YES in step S33), the image data stored in the one or more stored image addresses is classified using a learning model (step S34). The classification unit 161 then updates, to the classification confidence that is output when classifying, the classification confidence (stored in the confidence storage unit 170) for the combination of the image name and the image conversion number of the classified image data (step S35). The classification unit 161 deletes the image data used for the classification from the image data storage unit 130 (step S36).

Then, the classification unit 161 determines whether or not the number of image data deleted from the image data storage unit 130 is equal to or more than D (D is a natural number equal to or more than K) since attenuation unit 162 previously attenuated the classification confidences (step S37). In a phase where the classification confidences have not been attenuated once, the classification unit 161 determines whether or not the total number of deleted image data is equal to or more than D. When the number of deleted image data is less than D (NO in step S37), the confidence update unit 160 returns the processing to step S31. When the number of deleted image data is equal to or more than D (YES in step S37), the attenuation unit 162 attenuates all classification confidences stored in confidence storage unit 170 (step S38). Then, the attenuation unit 162 adds 1 to the learning processing times e stored in the confidence storage unit 170 (step S39). Thereafter, the confidence update unit 160 returns the processing to step S31.

Generally, in classifying data with deep learning and neural networks, values (0 to 1) of a classification target category number are output, and the largest output value is adopted as a classification confidence. Image data with a small classification confidence is image data that is inadequately used for training of the learning model. In order to efficiently obtain a highly accurate learning model, it is better for learning to use image data a classification criterion on which is not simple and which is not adequately learned, rather than repeatedly use adequate image data. Thereby the accuracy of the learning model can be improved efficiently. However, if a learning is performed using only image data on which the learning is inadequately performed, the property of the image data used as learning data is biased. This may reduce the accuracy of classification for the image data which was once classified with a high classification confidence.

By contrast, the learning device 100 according to the present example embodiment updates the classification confidences of image data used as learning data to the classification confidences obtained by classification of the image data. The learning device 100 according to the present example embodiment updates the classification confidences respectively associated with the plurality of image data when the number of image data on which classification has been performed satisfies a predetermined condition. Accordingly, the classification confidences of image data, which have not been selected for reasons such as that sufficient learning has been done with those image data as learning data, can be lowered and such image data come to be selected as learning data. Thereby, the learning device 10 can include, in the learning target, those image data that can be learning target, by performing learning many times. Thus, the learning device 100 can suppress the forgetting of learned contents for those image data already used as learning data many times, by performing learning many times, and so it is possible to improve the accuracy of the learning model. In addition, the learning can be performed efficiently.

In order to reduce the amount of memory required for learning, one would conceive a method in which image data are read and learned one by one, i.e., without causing all images to be loaded into a memory at once. In this method, the amount of memory required for learning can be reduced. However, in machine learning, it is common to allow the same image data to be learned over and over again. In this method, processing of reading the same image data to the memory many times and processing of discarding the image data are performed, which can be hardly said to be efficient.

By contrast, the image reading unit 120 of the learning device 100 according to the present example embodiment reads the image data on the basis of the classification confidence. In this way, as compared with the case of reading images one by one, the learning device 100 according to the present example embodiment can more efficiently perform the learning because images optimal for enhancing the accuracy of the learning model can be selected using the classification confidence.

When as many image data as the number set according to the capacity of the image data storage unit 130 are stored in the image data storage unit 130, the confidence update unit 160 classifies each of the image data, and deletes each of the image data from the image data storage unit 130 after the classification.

This makes it possible to reduce the number of inputs/outputs toward the image storage unit 110 and to efficiently use the image data storage unit 130, as compared with reading image data one by one.

There is a method, in performing machine learning of images, of, applying various image conversion processing to the image and performing the learning using the image subjected to the image conversion processing, instead of letting the image as it is be learned repeatedly. In this case, it is necessary to prepare and store images subjected to the image conversion processing which is assumed to be valid for all images in advance and to learn the stored images, or otherwise to apply image conversion processing at the timing of reading the image and to learn the image subjected to the image conversion processing. This method is effective for enhancing the accuracy of the learning model because it allows the types of images to be increased easily. However, it takes a longer time to perform the learning because the number of images to be learned increases proportionally. Therefore, this method is far from being an efficient learning method.

By contrast, learning device 100 according to the present example embodiment selects only the image data necessary for learning because the image reading unit 120 reads the image data using the classification confidence for a combination of a image data and image conversion method. Therefore, according to the learning device 100 according to the present example embodiment, only the necessary image data are sequentially read and learned, and therefore, the learning device 100 can reduce the memory size required for learning and increase the learning speed. Therefore, according to the learning device 100 according to the present example embodiment, learning can be performed efficiently.

It is preferable that the image conversion method to be used when the conversion unit 123 of the image reading unit 120 performs image conversion matches the image data to be image-converted and the characteristics of the category of classification. For example, provided that the classification unit 161 has an objective, as the characteristic of the category of classification, of classifying image data including images of hands into "a right hand" and "a left hand", the category in which the image data is classified converts if the image conversion method of horizontal inversion is applied to the image data. Therefore, in such a case, the image conversion method of horizontal inversion should not be applied to the image data of the hand.

Therefore, it is preferable that the classification confidence stored in the confidence storage unit 170 is not set for such a combination. In the case where the image data and the image conversion method randomly selected by the selection unit 121 are the combination as described above, the learning device 100 causes the selection unit 121 to again select the image data and the image conversion method, just like the case where the classification confidence is equal to or more than the confidence threshold Th.

Also, when image data is newly added to the image storage unit 110, the learning device 100 preferably registers a classification confidence that allows the image data to be selected by the selection unit 121. For example, the confidence update unit 160 monitors the image storage unit 110, and when the confidence update unit 160 detects that new image data have been registered, the confidence update unit 160 may register the classification confidence for the new image data in the confidence storage unit 170.

Thereby, the image reading unit 120 can determine whether or not to add, in the same way as to other image data, the added image data as learning data on the basis of the classification confidence. Therefore, the learning device 100 can learn faster than general additional learning.

The learning device 100 according to the present example embodiment may have a plurality of image reading units 120. With such a configuration, the learning device 100 can read image data in parallel. Therefore, the learning device 100 can perform faster learning. In this case, it is preferable that the image data storage unit 130 and the confidence storage unit 170 are implemented in an area where data can be shared between processes, such as shared memory.

Figure 11:
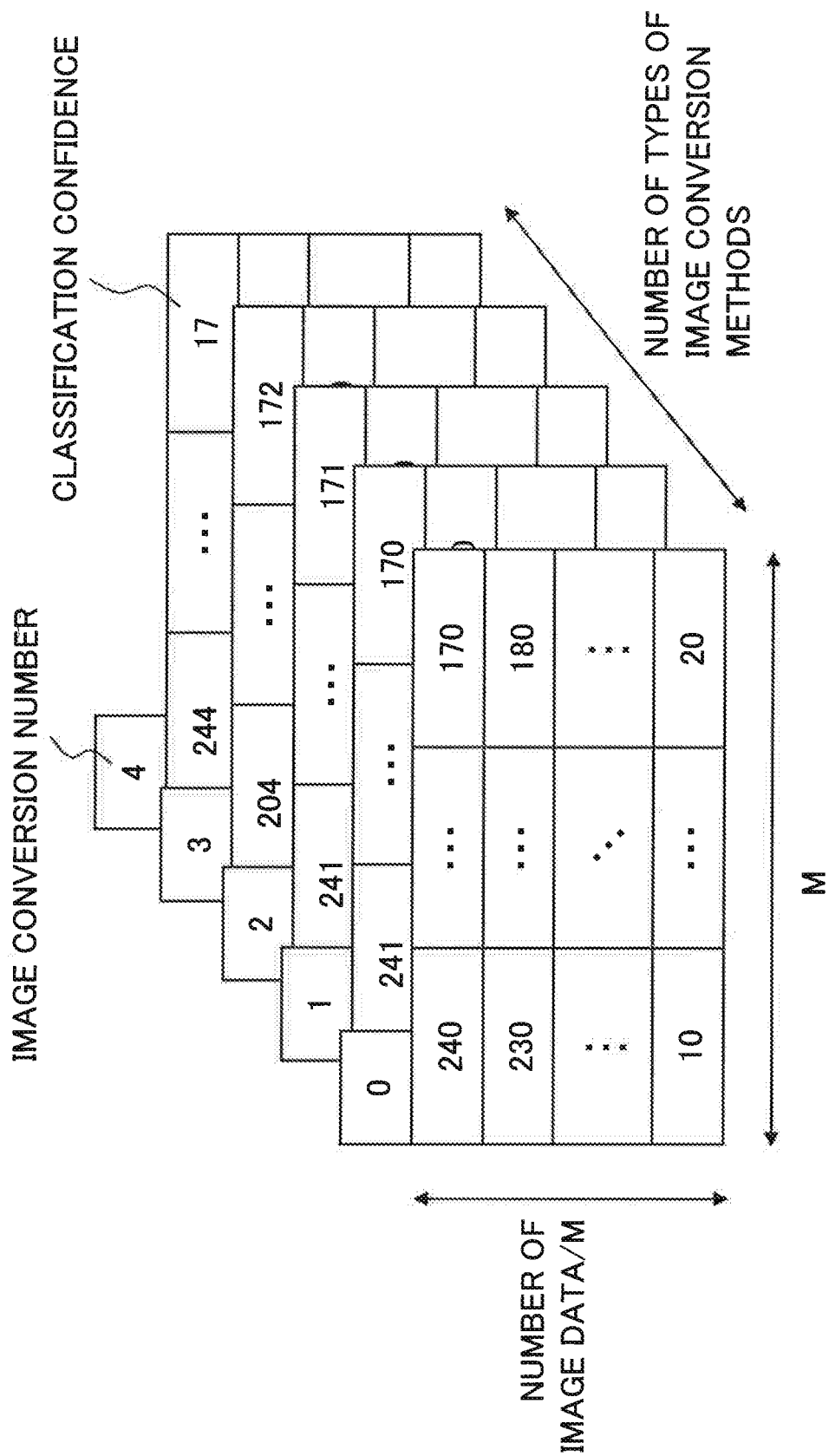
FIG. 11 is a diagram illustrating another example of classification confidences stored in the confidence storage unit.

The classification confidence stored in the confidence storage unit 170 is not limited to the format illustrated in FIG. 6, but it may be in the form illustrated in FIG. 11. FIG. 11 is a diagram illustrating another example of classification confidences stored in the confidence storage unit 170.

As illustrated in FIG. 11, the classification confidences stored in the confidence storage unit 170 may be stored in the same format as image data illustrated in FIG. 5. In such a format, the classification confidence is quantized with an integer value from 0 to 255, like the RGB value of image data. As illustrated in FIG. 11, the classification confidences are expressed in a tabular form for types of image conversion method. The width of each table is M (arbitrary natural number). The classification confidence may be stored at a position represented by the image ID or may be stored at a position of a value calculated from the image ID. For example, a classification confidence for image data having an image ID of "1" may be stored in the first row of the first column. The confidence threshold may be similarly expressed with a value of 0 to 255. Also, the image reading unit 120 may convert the classification confidence to a value between 0 and 1 so that it can be compared with a confidence threshold.

In this way, by saving the classification confidence in the same format as image data, it is possible to reduce the memory size used by the learning device 100. In addition, the learning device 100 can efficiently perform confidence attenuation processing by using a library specialized in image processing such as OpenCV (Open Source Computer Vision Library).

Second Example Embodiment

Figure 12:
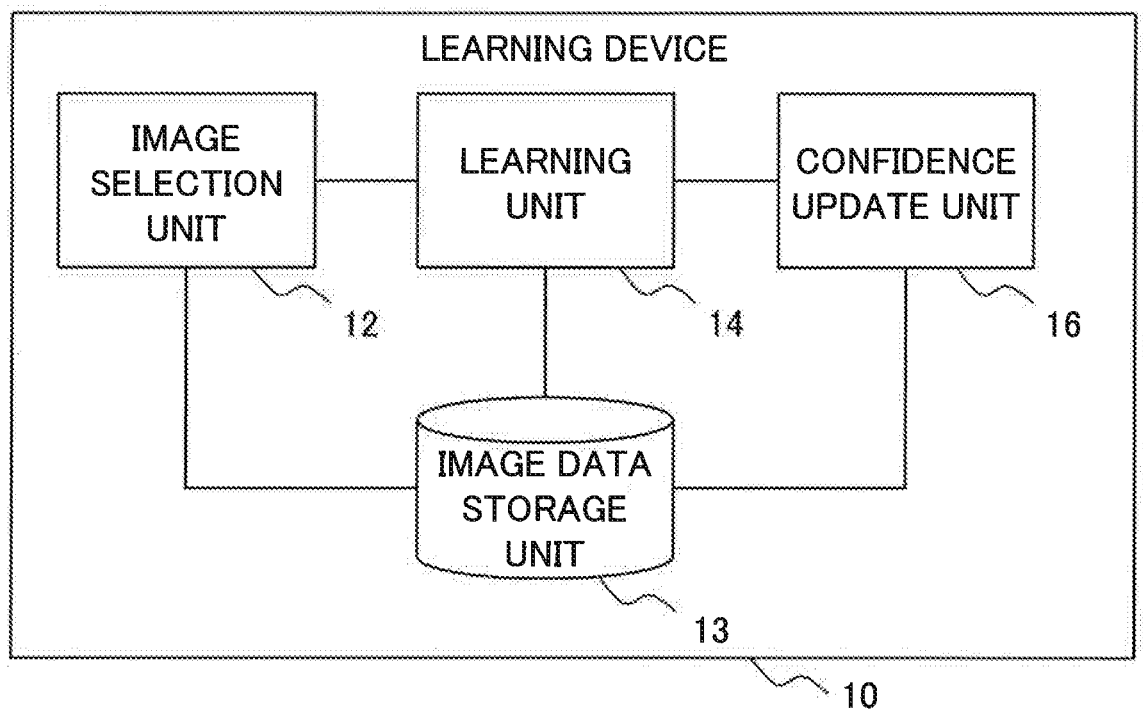
FIG. 12 is a functional block diagram illustrating an example of a functional configuration of a learning device according to a second example embodiment.
Figure 13:
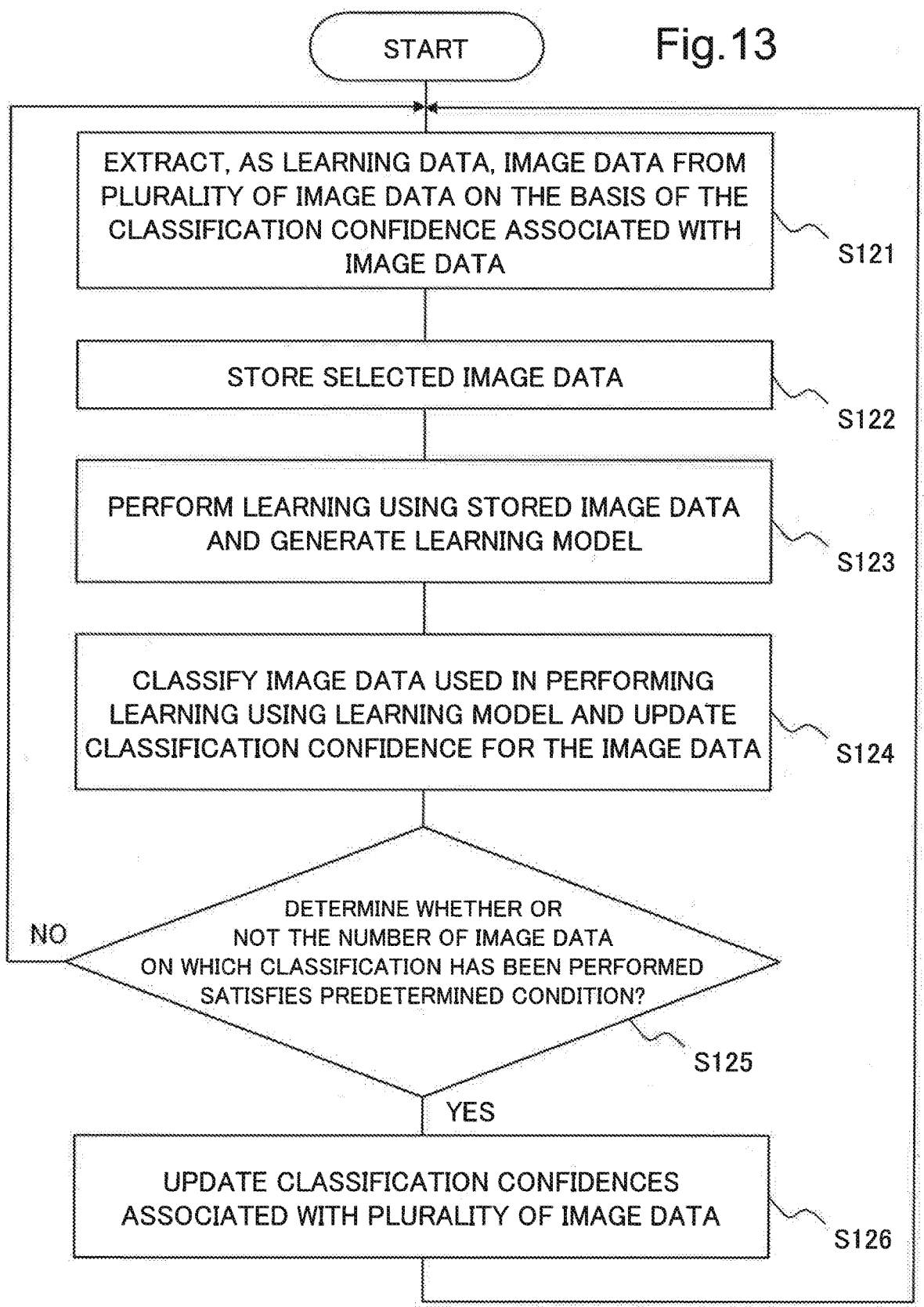
FIG. 13 is a flowchart illustrating an example of a learning processing flow of the learning device according to the second example embodiment.

The second example embodiment is explained hereinafter with reference to FIG. 12 and FIG. 13. The present example embodiment describes the minimum configuration to solve the problem in the present disclosure. FIG. 12 is a functional block diagram illustrating an example of a functional configuration of a learning device 10 according to the present example embodiment. As illustrated in FIG. 12, the learning device 10 according to the present example embodiment includes an image selection unit 12, an image data storage unit 13, a learning unit 14, and a confidence update unit 16.

The image selection unit 12 corresponds to the image reading unit 120 according to the first example embodiment described above. The image selection unit 12 selects image data as learning data from a plurality of image data, on the basis of a classification confidence indicating likelihood of accuracy of classification for image data. The classification confidences are respectively associated with the plurality of image data. The image selection unit 12 acquires the selected image data from a plurality of image data. For example, when a plurality of image data are stored in the storage unit as a data base, the image selection unit 12 reads the selected image data from this storage unit. The image selection unit 12 stores the acquired image data in the image data storage unit 13. Then, the image selection unit 12 supplies the address of the stored image data to the learning unit 14.

The image data storage unit 13 corresponds to the image data storage unit 130 according to the first example embodiment described above. In the image data storage unit 13, the image data selected by the image selection unit 12 is stored.

The learning unit 14 corresponds to the learning unit 140 according to the first example embodiment described above. The learning unit 14 receives the address of the image data from the image selection unit 12. The learning unit 14 performs learning using the image data stored in the received address and generates a learning model. The learning unit 14 supplies the address of the image data used for learning and the generated learning model to the confidence update unit 16.

The confidence update unit 16 corresponds to the confidence update unit 160 according to the first example embodiment described above. The confidence update unit 16 receives the address and the learning model of the image data from the learning unit 14. The confidence update unit 16 classifies the image data stored in the address by using a learning model. Then, the confidence update unit 16 updates the classification confidence for the image data.

The confidence update unit 16 updates the classification confidences respectively associated with the plurality of image data when the number of classified image data satisfies a predetermined condition. For example, when the number of classified image data reaches a predetermined number, the confidence update unit 16 attenuates each of the classification confidences of the plurality of image data from which the image selection unit 12 can select the image data.

Next, the processing flow of learning device 10 according to the present example embodiment is explained with reference to FIG. 13. FIG. 13 is a flowchart illustrating an example of the flow of learning processing of the learning device 10 according to the present example embodiment. As illustrated in FIG. 13, in the learning device 10 according to the present example embodiment, the image selection unit 12 extracts, as learning data, image data from the plurality of image data on the basis of the classification confidence associated with the image data (step S121). Then, the image selection unit 12 stores the selected image data in the image data storage unit 13 (step S122).

The learning unit 14 performs learning using the image data stored in the image data storage unit 13 and generates a learning model (step S123). After that, the confidence update unit 16 classifies the image data used in performing the learning stored in the image data storage unit 13 using the learning model and updates the classification confidence for the image data (step S124). Then, the confidence update unit 16 determines whether or not the number of image data on which classification has been performed satisfies a predetermined condition (step S125). When the predetermined condition is satisfied (YES in step S125), the confidence update unit 16 updates the classification confidences respectively associated with the plurality of image data (step S126). After step S126 or in the case of NO in step S125, the learning device 10 returns the processing to step S121.

As described above, the learning device 10 according to the present example embodiment classifies the image data used for learning using the learning model and updates the classification confidence for the image data. As a result, the image selection unit 12 can select image data as learning data on the basis of the updated classification confidence in the next image selection. In this way, the image selection unit 12 selects, as learning data, image data classification confidence of which is lower than a predetermined threshold. Therefore, the image selection unit 12 does not select image data that has been sufficiently learned as learning data like image data with a high classification confidence, for example, as learning data. Therefore, only the image data selected by the image selection unit 12 are stored in the image data storage unit 13 on the basis of the classification confidence. As a result, the learning device 10 can reduce the amount of memory required for learning.

The confidence update unit 16 updates the classification confidences respectively associated with the plurality of image data when the number of image data on which classification has been performed satisfies a predetermined condition. As a result, the classification confidences of the image data which have not been selected for reasons such as that sufficient learning has been done with those image data as learning data, can be lowered and those image data can be selected as learning data. By doing so, the learning device 10 can include, in the learning target, the image data that can be learning target by performing learning many times. Therefore, the learning device 10 can suppress the forgetting of a learning content for the image data already used as learning data many times by performing learning many times, and so it is possible to improve the accuracy of the learning model. Furthermore, the learning can be performed efficiently.

(Regarding Hardware Configuration)

Figure 14:
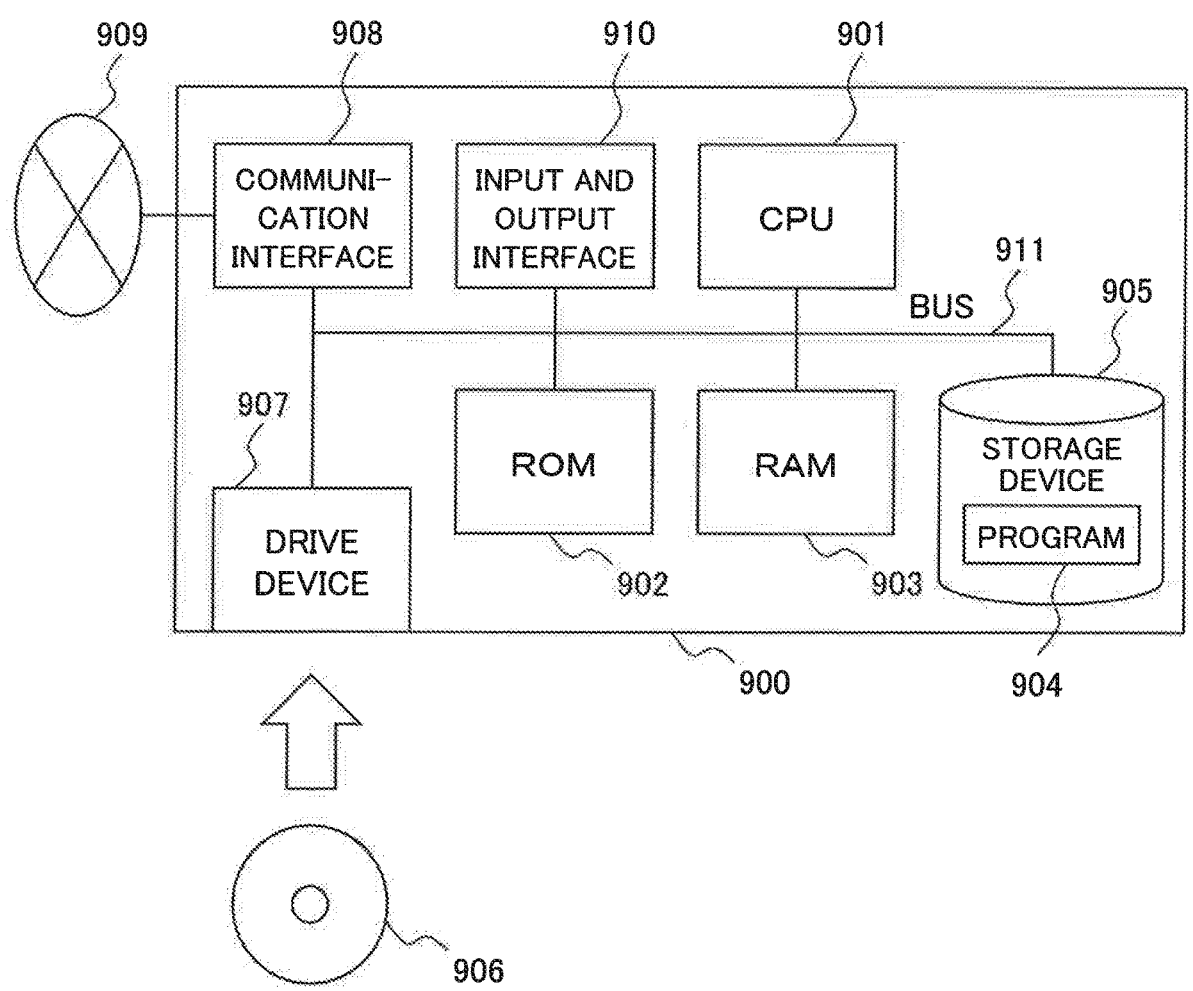
FIG. 14 is a diagram illustrating a hardware configuration of a computer (information processing apparatus) capable of achieving a learning device in each example embodiment as an example.

In each example embodiment of the present disclosure, each of the constituent elements of each learning device is denoted by a block for each function. Some or all of the constituent elements of each learning device may be achieved by appropriate combination of the information processing apparatus 900 illustrated in FIG. 14 and a program, for example. The information processing apparatus 900 includes, for example, the following components.

a CPU (Central Processing Unit) 901
a ROM (Read Only Memory) 902
a RAM (Random Access Memory) 903
a program 904 loaded to RAM 903
a storage device 905 storing the program 904
a drive device 907 for reading and/or writing data from/into storage medium 906
a communication interface 908 connected to a communication network 909
an input/output interface 910 for inputting and outputting data
a bus 911 for connecting each constituent element Each constituent element of each learning device in each example embodiment is achieved by the CPU 901 loading and executing the program 904 for achieving these functions. The program 904 for achieving the function of constituent elements of each learning device is stored in, for example, the storage device 905 or the RAM 903 in advance. The CPU 901 reads the program as necessary. The program 904 may be supplied to the CPU 901 via the communication network 909 or may be stored in advance in the storage medium 906 and the drive device 907 may read the program and supply the program to the CPU 901.

There are various modifications in the method for implementing each learning device. For example, each learning device may be achieved by an available combination of information processing devices 900 and programs individually provided for the constituent elements. A plurality of constituent elements of each learning device may be achieved by an available combination of one information processing device 900 and a program.

Some or all of the constituent elements of each learning device may be achieved by other general-purpose or dedicated circuit, processors and the like, or a combination thereof. Some or all of the constituent elements may be achieved by a single chip or may be achieved by a plurality of chips connected to one another via a bus.

Some or all of the constituent elements of each learning device may be realized by a combination of the above-described circuit etc. and program.

In an embodiment where some or all of the constituent elements of each learning device is achieved by a plurality of information processing devices, circuits, and/or the like, the plurality of information processing devices, circuits, and/or the like may be concentratedly arranged or arranged in a distributed manner. For example, the information processing device, circuits, and/or the like may be achieved in a form in which they are connected via a communication network, such as a client and server system, a cloud computing system, and the like.

Each of the above-described example embodiments are preferred example embodiments of the present disclosure, and does not limit the scope of the present disclosure only to each of the above-mentioned example embodiments. Those skilled in the art can modify or substitute the above-described example embodiments within a range that does not deviate from the gist of the present disclosure and to make various modifications.

This application is based upon and claims the benefit of priority from Japanese patent application No. 2016-033280, filed on Feb. 24, 2016, the disclosure of which is incorporated herein in its entirety by reference.

REFERENCE SIGNS LIST 10 learning device
12 image selection unit
13 image data storage unit
14 learning unit
16 confidence update unit
100 learning device
110 image storage unit
120 image reading unit
121 selection unit
122 reading unit
123 conversion unit
130 image data storage unit
140 learning unit
150 learning model storage unit
160 confidence update unit
161 classification unit
162 attenuation unit
170 confidence storage unit
180 threshold updating unit

What is claimed is:

1. A learning device comprising:
a memory that stores instructions; and
at least one processing device coupled to the memory, the at least one processing device being configured to execute the instructions to:
select image data having a classification confidence less than a confidence threshold as learning data based on classification confidences from a plurality of image data, wherein each of the classification confidences indicates a likelihood of accuracy of classification for a respective one of the plurality of image data and is associated with the respective one of the plurality of image data;
store the selected image data into a storage;
perform learning using the stored image data and generating a learning model;
perform classification of the image data used for the learning by using the learning model and update a classification confidence for the classified image data; and
attenuate the classification confidences each associated with a respective one of the plurality of image data when a count of image data on which the classification has been performed satisfies a predetermined condition.

2. The learning device according to claim 1, wherein the at least one processing device is further configured to, when the storage stores as many image data as a set number which is set according to a capacity of the storage, perform classification of each of the stored image data, and deletes each of the stored image data from the storage after the classification.

3. The learning device according to claim 2, wherein the at least one processing device is further configured to, when a count of image data which the classification has been performed on and are deleted from the storage is equal to or more than a predetermined number, attenuate the classification confidences each associated with the respective one of the plurality of image data.

4. The learning device according to claim 1, wherein the at least one processing device is further configured to:
select an image conversion method to be applied to the image data and selects the image data as learning data, based on the classification confidence associated with the selected image conversion method and the image data;
apply the image conversion method to the selected image data; and
store the image data to which the image conversion is applied into the storage.

5. The learning device according to claim 1, wherein the at least one processing device is further configured to:
calculate the confidence threshold to be compared with the classification confidence;
calculate, as the confidence threshold, a classification confidence that satisfies a second predetermined condition from among the classification confidences; and
select, when the classification confidence is less than the confidence threshold, the image data as learning data.

6. The learning device according to claim 5, wherein the at least one processing device is further configured to sort the classification confidences in ascending order, and adopt, as the confidence threshold, a classification confidence existing at a position of a value calculated according to a progress status of learning out of the sorted classification confidences.

7. The learning device according to claim 5, wherein the at least one processing device is configured to update the confidence threshold successively to updating the classification confidences.

8. The learning device according to claim 1, wherein the at least one processing device is further configured to:
   count a number of times the classification confidences each associated with the respective one of the plurality of image data are updated; and
   select the image data when the counted number is less than a predetermined threshold.

9. A learning method comprising:
   selecting image data having a classification confidence less than a confidence threshold as learning data based on classification confidences from a plurality of image data, wherein each of the classification confidences indicates a likelihood of accuracy of classification for a respective one of the plurality of image data and is associated with the respective one of the plurality of image data;
   storing the selected image data;
   performing learning using the stored image data and generating a learning model;
   performing classification of the image data used for the learning by using the learning model and updating a classification confidence for the classified image data; and
   attenuating the classification confidences each associated with a respective one of the plurality of image data when a count of image data on which the classification has been performed satisfies a predetermined condition.

10. A non-transitory computer-readable recording medium recording a program that causes a computer to execute:
   selecting image data having a classification confidence less than a confidence threshold as learning data based on classification confidences from a plurality of image data, wherein each of the classification confidences indicates a likelihood of accuracy of classification for a respective one of the plurality of image data and is associated with the respective one of the plurality of image data;
   storing the selected image data;
   performing learning using the stored image data and generating a learning model; and
   performing classification of the image data used for the learning by using the learning model and updating a classification confidence for the classified image data,
   attenuating the classification confidences each associated with a respective one of the plurality of image data when a count of image data on which the classification has been performed satisfies a predetermined condition.

* * * * *